US008999574B2

(12) United States Patent
Liu et al.

(10) Patent No.: US 8,999,574 B2
(45) Date of Patent: Apr. 7, 2015

(54) METHOD OF PREPARING GRAPHENE-SULFUR NANOCOMPOSITES FOR RECHARGEABLE LITHIUM-SULFUR BATTERY ELECTRODES

(71) Applicant: Battelle Memorial Institute, Richland, WA (US)

(72) Inventors: Jun Liu, Richland, WA (US); John P. Lemmon, Kennewick, WA (US); Zhenguo Yang, Bellevue, WA (US); Yuliang Cao, Richland, WA (US); Xiaolin Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/225,561

(22) Filed: Mar. 26, 2014

(65) Prior Publication Data

US 2014/0203469 A1 Jul. 24, 2014

Related U.S. Application Data

(62) Division of application No. 13/023,241, filed on Feb. 8, 2011, now Pat. No. 8,753,772.

(60) Provisional application No. 61/390,945, filed on Oct. 7, 2010.

(51) Int. Cl.
*H01M 4/04* (2006.01)
*B82Y 30/00* (2011.01)
(Continued)

(52) U.S. Cl.
CPC .............. *H01M 4/049* (2013.01); *B82Y 30/00* (2013.01); *H01M 4/136* (2013.01);
(Continued)

(58) Field of Classification Search
CPC .... B82Y 30/00; H01M 4/136; H01M 4/1397; H01M 4/5815; H01M 4/623; H01M 10/052; H01M 4/049
USPC .............. 429/213, 231.8; 977/734, 773, 840; 252/182.1
See application file for complete search history.

(56) References Cited

U.S. PATENT DOCUMENTS

2009/0246625 A1 10/2009 Lu
2011/0165466 A1 7/2011 Zhamu et al.

FOREIGN PATENT DOCUMENTS

CN 1485941 3/2004
JP 2010219047 9/2010
(Continued)

OTHER PUBLICATIONS

Office Action for Chinese Patent Application No. 201180048678.1 (mailed Nov. 19, 2014).
(Continued)

*Primary Examiner* — Milton I Cano
*Assistant Examiner* — Michael Dignan
(74) *Attorney, Agent, or Firm* — Klarquist Sparkman, LLP

(57) ABSTRACT

A method of preparing a graphene-sulfur nanocomposite for a cathode in a rechargeable lithium-sulfur battery comprising thermally expanding graphite oxide to yield graphene layers, mixing the graphene layers with a first solution comprising sulfur and carbon disulfide, evaporating the carbon disulfide to yield a solid nanocomposite, and grinding the solid nanocomposite to yield the graphene-sulfur nanocomposite. Rechargeable-lithium-sulfur batteries having a cathode that includes a graphene-sulfur nanocomposite can exhibit improved characteristics. The graphene-sulfur nanocomposite can be characterized by graphene sheets with particles of sulfur adsorbed to the graphene sheets. The sulfur particles have an average diameter of less than 50 nm.

10 Claims, 5 Drawing Sheets

(51) Int. Cl.
    *H01M 4/136*     (2010.01)
    *H01M 4/1397*     (2010.01)
    *H01M 4/58*     (2010.01)
    *H01M 4/62*     (2006.01)
    *H01M 10/052*     (2010.01)

(52) U.S. Cl.
    CPC ......... *H01M 4/1397* (2013.01); *H01M 4/5815* (2013.01); *H01M 4/623* (2013.01); *H01M 10/052* (2013.01); *Y02E 60/122* (2013.01); *Y10S 977/734* (2013.01); *Y10S 977/773* (2013.01); *Y10S 977/84* (2013.01)

(56) References Cited

FOREIGN PATENT DOCUMENTS

| | | |
|---|---|---|
| JP | 2010219048 | 9/2010 |
| JP | 2011514638 | 5/2011 |
| JP | 2011517053 | 5/2011 |
| KR | 100390748 | 6/2003 |
| KR | 10-0390748 | 7/2003 |
| KR | 1020040026207 | 3/2004 |

OTHER PUBLICATIONS

Office Action for Japanese Patent Application No. 2013-532796 (mailed Oct. 28, 2014).

Chen et al., "The preparation of nano-sulfur/MWCNTs and its electrochemical performance," *Electrochimica Acta*, vol. 55, No. 27, pp. 8062-8066 (Nov. 2010).

Ding et al., Preparation of nano-structured $LiFePO_4$/graphene composites by co-precipitation method, *Electrochemical Communications*, vol. 12, pp. 10-13 (Oct. 2009).

Du et al., "New Method to Prepare Graphene Nanocomposites," *Chem. Mater.*, vol. 20, pp. 2066-2068 (Feb. 2008).

English Machine Translation of KR1020040026207 (Mar. 2004).

International Preliminary Report on Patentability for PCT/US2011/041186 (Mailed Apr. 9, 2013).

International Search Report for PCT/US2011/041186 (Mailed Jun. 29, 2012).

Ji et al., "A highly ordered nanostructured carbon-sulphur cathode for lithium-sulphur batteries," *Natural Materials*, vol. 8, pp. 500-506 (May 2009).

Wang et al., "Ternary Self-Assembly of Ordered Metal Oxide-Graphene Nanocomposites for Electrochemical Energy Storage," *American Chemical Society*, vol. 4, No. 3, pp. 1587-1595 (Feb. 2010).

Wang et al., "Self-Assembled $TiO_2$-Graphene Hybrid Nanostructures Li-Ion Insertion," *American Chemical Society*, vol. 3, No. 4, pp. 907-914 (Mar. 2009).

Written Opinion for PCT/US2011/041186 (Mailed Jun. 29, 2012).

Yuan et al., "Improvement of cycle property of sulfur-coated multi-walled carbon nanotubes composite cathode for lithium/sulfur batteries," *Journal of Power Sources*, vol. 189, No. 2, pp. 1141-1146 (Apr. 2009).

Zheng et al., "Novel nanosized adsorbing sulfur composite cathode materials for the advanced secondary lithium batteries," *Electrochimica Acta*, vol. 51, No. 7, pp. 1330-1335 (Jan. 2006).

METHOD OF PREPARING GRAPHENE-SULFUR NANOCOMPOSITES FOR RECHARGEABLE LITHIUM-SULFUR BATTERY ELECTRODES

PRIORITY

This is a Divisional of U.S. patent application Ser. No. 13/023,241, filed Feb. 8, 2011, which claims the benefit of U.S. Provisional Patent Application No. 61/390,945, filed Oct. 7, 2010, now U.S. Pat. No. 8,753,772, issued on Jun. 17, 2014, both of which are incorporated by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

High-performance batteries can serve as part of a solution to supply and storage problems and environmental issues related to the replacement of fossil-fuel-based energy with clean alternative energy. Lithium-sulfur batteries, in particular, are of interest because of the high theoretical specific energy density (2600 Wh $kg^{-1}$), high theoretical specific capacity (1680 mAh $g^{-1}$), low material cost, and low safety risk. However, the poor electrical conductivity of elemental sulfur, the dissolution and shuttling of polysulfide intermediates, and the resultant poor cycling performance limits the applicability and usefulness of Li—S batteries. Accordingly, a need exists for Li—S batteries that exhibit improvements in reversible capacity, rate capability, and cycling stability.

SUMMARY

The present invention includes a rechargeable lithium-sulfur battery having a cathode characterized by a nanocomposite comprising graphene sheets with particles comprising sulfur adsorbed to the graphene sheets. The sulfur particles have an average diameter less than 50 nm. The invention further includes methods for making the nanocomposite graphene sheets. Batteries based on embodiments of the present invention can have a reversible capacity greater than 950 mAh $g^{-1}$ even after 100 cycles. In some embodiments, the tap density of the graphene-sulfur nanocomposite powder is preferably greater than 0.92 g $cm^{-3}$. Furthermore, the sulfur content in the nanocomposite is preferably greater than approximately 70 wt %.

The graphene sheets can be arranged randomly, pseudo-randomly, or in a layered stack. In the random arrangement, graphene sheets and/or regions of graphene sheets having adsorbed sulfur particles do not exhibit a recognizable pattern in the arrangement of graphene sheets. The layered stack can comprise adsorbed particles arranged in sulfur layers between graphene sheets and/or layers of graphene sheets, wherein the sulfur layers and graphene layers substantially alternate. The pseudo-random arrangement can comprise a mixture of random and stacked phases of graphene sheets.

In a preferred embodiment, the cathode comprises a polymer contacting the nanocomposite to minimize diffusion of polysulfide species into the electrolyte. The polymer can be applied to coat the nanocomposite surfaces. Alternatively, the polymer, the graphene sheets, and the sulfur particles can compose a mixture. Preferably, the polymer is a cationic membrane. A particular example, includes, but is not limited to a sulfonated tetrafluoroethylene based fluoropolymer-co-polymer. Batteries having such a polymer can exhibit a discharge capacity of at least 74% of an initial capacity even after 50 cycles at 0.1 C. An alternative example of a polymer includes, but is not limited to, polyethylene oxide (PEO).

According to one embodiment of the present invention, the graphene-sulfur nanocomposite having graphene sheets with adsorbed sulfur particles can be prepared by first thermally expanding a graphite oxide to yield graphene sheets and then mixing the graphene sheets with a first solution comprising sulfur and carbon disulfide. The carbon disulfide is evaporated to then yield a solid nanocomposite, which is ground to yield the graphene-sulfur nanocomposite powder having primary sulfur particles with an average diameter less than approximately 50 nm.

The polymer described elsewhere herein, can be applied by mixing the graphene-sulfur nanocomposite with a second solution comprising a polymer and a solvent and then removing the solvent, according to one embodiment.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
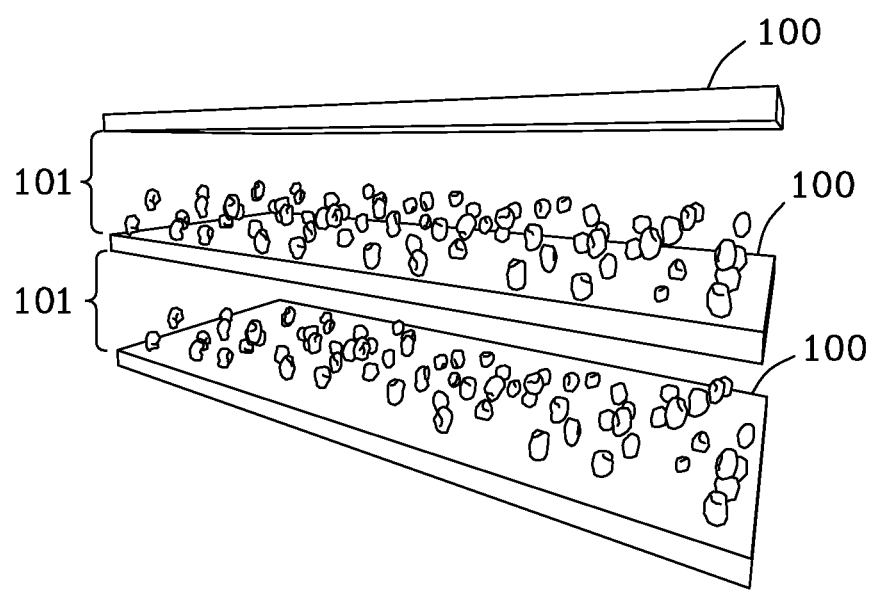
FIG. 1 is an illustration depicting a graphene-sulfur nanocomposite arranged in an ordered stack according to one embodiment of the present invention.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

A graphene-sulfur nanocomposite comprising a stack of alternating layers of graphene sheets and sulfur particles was synthesized according to embodiments of the present invention. 80 mg of graphene sheets was prepared by thermal expansion of graphite oxide and 3.2 g of a 10 wt % solution of sulfur in carbon disulfide ($CS_2$), which were mixed together. The mixture was sonicated for 10-15 min and evaporated in a hood to exclude $CS_2$ while stirring in nitrogen gas. The drying sample was heated at 155° C. with protection of nitrogen gas to better load sulfur on the surface of graphene. Once the $CS_2$ had been substantially removed, thereby forming a solid nanocomposite, the solid nanocomposite was ground by using high-energy ball milling for 8 h. After grinding, the amount of sulfur in the graphene-sulfur nanocomposite was determined to be about 71.8 wt % by a thermogravimetric analyzer in argon at a scan rate of 10° C./min from room temperature to 800° C.

A polymer coated graphene-sulfur nanocomposite was also synthesized. 100 mg of of a graphene sulfur nanocomposite formed according to embodiments of the present invention was mixed with 0.5 g of a 0.1 wt % NAFION® (e.g., sulfonated tetrafluoroethylene based fluoropolymer-copolymer) solution. The mixture was stirred continuously overnight and then heated to 80° C. under stirring to evaporate the solvent from the NAFION® solution. The NAFION®-coated graphene-sulfur nanocomposite was obtained by drying under vacuum to remove any residual solvent.

For electrochemical characterization, graphene-sulfur nanocomposite powders, synthesized according to embodiments of the present invention, were used to prepare cathodes. 80 wt % graphene-sulfur nanocomposite powder, 10 wt. % SP-type carbon black, and 10 wt. % polyvinylidene difluoride (PVDF) dissolved in N-methyl-2-pyrrolidone (NMP) were combined to form a slurry. The electrode slurry was then cast onto Al foil. Electrochemical tests of the electrode materials were performed using coin cells with the graphene-sulfur nanocomposite cathode and lithium metal as both counter and reference electrode. The electrolyte was 1M Lithium Bis (trifluoromethane)sulfonamide lithium (LiTFSI) dissolved in a mixture of 1,3-dioxolane (DOL) and dimethyoxyethane (DME) (1:1 by volume). The separator used was a microporous membrane (CELGARD® 2400) and the cells were assembled in an argon-filled glove box. The galvanostatic charge-discharge test was conducted at a voltage interval of 1.0-3.0 V by a battery testing system. Cyclic voltammetric measurements were also carried out with the coin cell at a scan rate of 0.1 mV $s^{-1}$ using an electrochemical interface.

FIGS. 1-4 show a variety of aspects, experimental results, and embodiments of the present invention. FIG. 1 is a schematic illustration depicting a graphene-sulfur nanocomposite arranged in an ordered stack. Graphene sheets 100 and layers of adsorbed sulfur particles 101 alternate in the stacks. In an alternative arrangement (not illustrated), the graphene sheets with adsorbed sulfur particles can be randomly arranged.

Figure 2A:
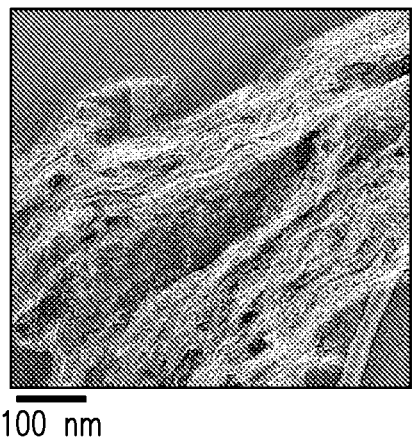
FIGS. 2a and 2b are cross-section transmission electron microscope (TEM) images at two different magnifications of a graphene-sulfur nanocomposite arranged in a layered stack according to embodiments of the present invention.
Figure 2B:
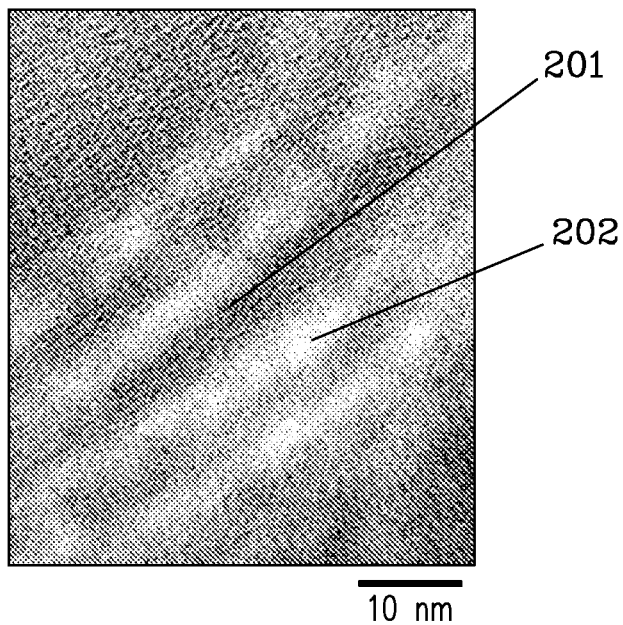

FIG. 2a is a cross-section TEM image of a graphene-sulfur nanocomposite showing large domains of layered material. The high resolution TEM image in FIG. 2b shows the alternating layers of graphene (low contrast/light regions) 201 and layers of adsorbed sulfur particles (high contrast/dark regions) 202. In this particular embodiment, the sulfur particles are less than or equal to approximately 20 nm in diameter.

Figure 3A:
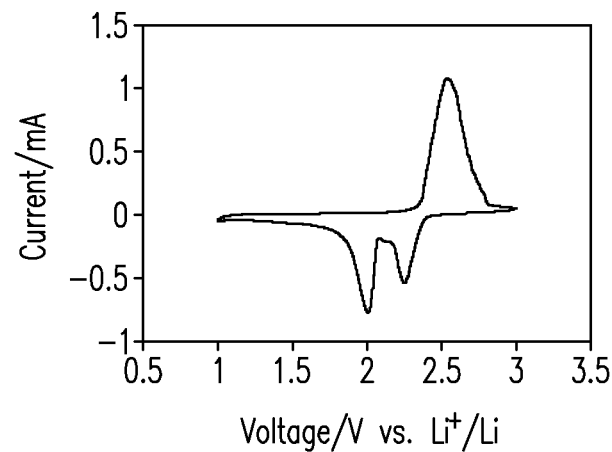
FIGS. 3a-3d include graphs providing data on the electrochemical properties of graphene-sulfur nanocomposite cathodes synthesized according to embodiments of the present invention.
Figure 3B:
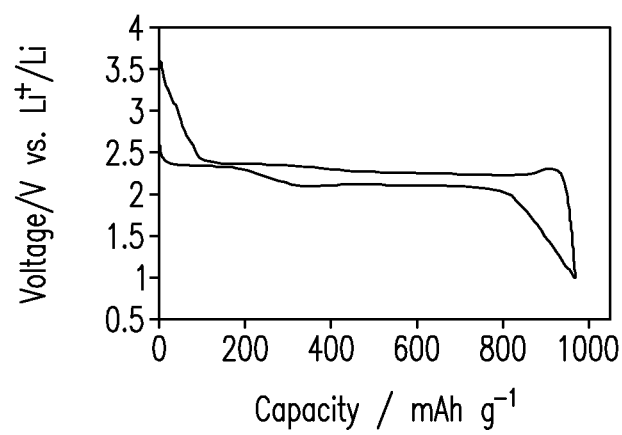
Figure 3C:
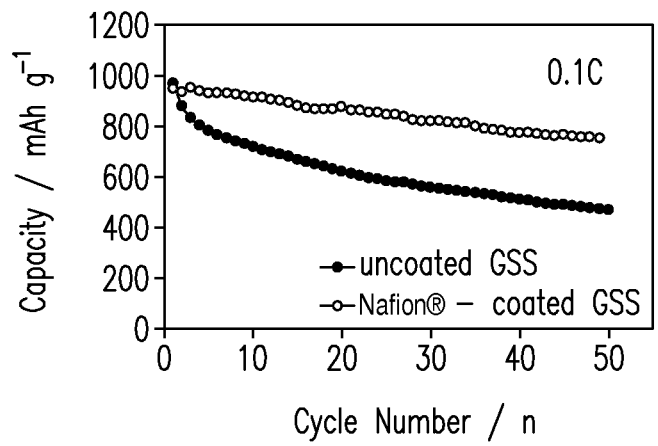

The electrochemical properties of a graphene-sulfur nanocomposite based on embodiments of the present invention were tested using a cyclic voltammogram (CV) and a constant current charge-discharge measurement. A CV curve of is shown in FIG. 3a. Since the graphene only plays a role as an electronic conductor and does not contribute to the capacity in the potential region, the CV characteristics shown in FIG. 3a can only be attributed to the intrinsic reduction and oxidation of sulfur, showing two reduction peaks and one oxidation peak. According to the electrochemical reduction mechanism of sulfur electrodes, the reduction peak around 2.3V is related to the reduction of the elemental sulfur dissolved in the electrolyte to lithium polysulfide ($Li_2S_n$, 4≤n<8) and the other reduction peak at 2.0V is attributable to a decrease of polysulfide chain length and eventual formation of $Li_2S$. During a reversed anodic scan, only one oxidation peak appeared at 2.5V, suggesting that the peaks of the two oxidation reactions are too close to distinguish. The large overpotential observed for the second redox reaction implies a high polarization could occur when transforming from lithium polysulfide to $Li_2S$. This is due to the fact that overcoming the change of chain length requires higher activation energy. FIG. 3b shows the first charge-discharge profile of the graphene-sulfur nanocomposite at a constant current of 168 mA $g^{-1}$ (corresponding to a 0.1 C rate). The discharge curve showed a two-stage discharge profile, corresponding to the two types of discharge reactions, in good agreement with the CV results shown in FIG. 3a. The graphene-sulfur nanocomposite electrode delivered an initial discharge capacity of 967 mAh $g^{-1}$ but exhibited 52% fade after 50 cycles as shown in FIG. 3c. This shows that the layered nanostructure with alternating graphene and sulfur layers provides a highly conductive, active framework but migration of soluble polysulfide species during cycling must be reduced.

Accordingly, in preferred embodiments, a polymer is applied to the graphene-sulfur nanocomposite to further control the soluble sulfur species. Scanning electron microscopy (SEM) images (not shown) of NAFION®-coated and uncoated nanocomposites show that the polymer can coat the particle surface of the graphene-sulfur nanocomposite to prohibit diffusion of the polysulfide.

Figure 3D:
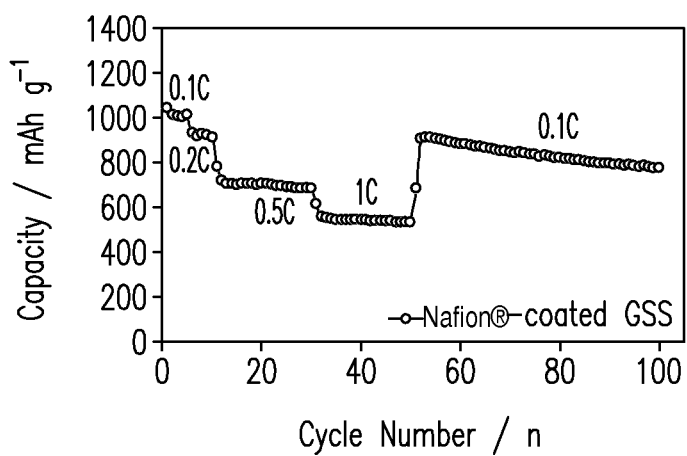
Figure 4:
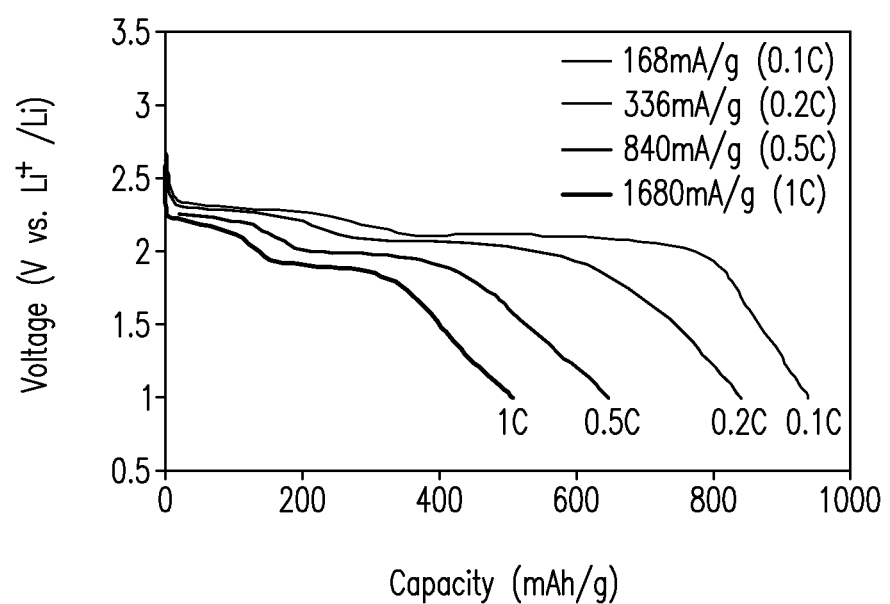
FIG. 4 is a graph depicting the voltage versus specific capacity of a graphene-sulfur nanocomposite cathode having an applied polymer according to embodiments of the present invention.

Referring to the graph of capacity as a function of cycle number in FIG. 3c, the NAFION®-coated graphene-sulfur nanocomposite electrode retains 79.4% of the initial capacity after 50 charge/discharge cycles, exhibiting good cycling stability. Additional stability and rate capability performance of the NAFION®-coated graphene-sulfur nanocomposite electrode is shown in FIG. 3d. Though the initial discharge capacity changes very little before and after coating, the NAFION®-coated graphene-sulfur nanocomposite retains 74.3% of the initial capacity after 100 cycles at 0.1 C. FIG. 4, shows the voltage profile versus specific capacity of the NAFION-coated graphene-sulfur nanocomposite at various discharge rates (1 C=1680 mA $g^{-1}$). The nanocomposite cathodes deliver 839, 647 and 505 mAh $g^{-1}$ at 0.2 C, 0.5 C and 1 C respectively, corresponding to 89%, 69% and 54% retention of the discharge capacity measured at 0.1 C. The improved rate capability and high cycling stability of the NAFION®-coated electrode can be attributed to the high electronic conductivity of the graphene layers and the reduced polysulfide dissolution/migration provided by the NAFION® coating. The applied polymer coating appears to provide improved mechanical strength in addition to improved chemical and electrochemical stability. In particular, a sulfonated tetrafluoroethylene fluoropolymer-copolymer can form dense films to coat the surface of graphene-sulfur nanocomposites, which inhibit the polysulfide from diffusing into the electrolyte from the adsorbed sulfur particles. Furthermore, since it is a cationic membrane with sulfonate ionic groups, Li ions readily diffuse through the membrane, while still suppressing polysulfide anion transport, most likely due to electrostatic repulsion.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of preparing a graphene-sulfur nanocomposite for a cathode in a rechargeable lithium-sulfur battery, the graphene-sulfur nanocomposite comprising graphene layers, wherein the graphene layers have thicknesses of equal to or less than about 10 nm, and with particles comprising sulfur adsorbed to the graphene layers, the method comprising:
   thermally expanding graphite oxide to yield graphene layers;
   mixing the graphene layers with a first solution comprising sulfur and carbon disulfide;
   evaporating the carbon disulfide to yield a solid nanocomposite; and
   grinding the solid nanocomposite to yield the graphene-sulfur nanocomposite having sulfur particles with an average diameter less than approximately 50 nm.

2. The method of claim 1, further comprising mixing the graphene-sulfur nanocomposite with a second solution comprising a polymer and a solvent, and then removing the solvent.

3. The method of claim 2, wherein the polymer is a cationic membrane.

4. The method of claim 2, wherein the polymer comprises a sulfonated tetrafluoroethylene based fluoropolymercopolymer.

5. The method of claim 2, wherein the polymer comprises PEO.

6. The method of claim 1, wherein the battery has a discharge capacity of at least 74% of an initial capacity after 50 cycles at 0.1 C.

7. The method of claim 1, wherein a powder of the graphene-sulfur nanocomposite has a tap density greater than 0.82 g cm$^{-3}$.

8. The method of claim 1, further comprising forming a stack of alternating graphene and sulfur layers, the sulfur layers comprising adsorbed particles between graphene layers.

9. The method of claim 1, wherein the rechargeable lithium-sulfur battery has a reversible capacity greater than 950 mAh g$^{-1}$.

10. The method of claim 1, wherein the graphene-sulfur nanocomposite has a sulfur loading that is greater than 70 wt %.

* * * * *